United States Patent [19]

Shibata et al.

[11] 4,396,659
[45] Aug. 2, 1983

[54] MAGNETIC RECORDING MEDIUM

[75] Inventors: Fujio Shibata; Kiyotaka Okuyama, both of Tokyo, Japan

[73] Assignee: TDK Electronics Co., Ltd., Tokyo, Japan

[21] Appl. No.: 109,032

[22] Filed: Jan. 2, 1980

[30] Foreign Application Priority Data

Oct. 16, 1979 [JP] Japan .................................. 54/2210

[51] Int. Cl.³ .............................................. G11B 5/70
[52] U.S. Cl. .................... 428/64; 252/62.53; 252/62.54; 360/134; 360/135; 427/128; 428/413; 428/425.9; 428/694
[58] Field of Search ..................... 428/900, 425.9, 694, 428/695, 64, 65, 413, 508; 427/127, 128; 252/62.54, 62.53; 360/134, 135, 136

[56] References Cited

U.S. PATENT DOCUMENTS 3,320,090 5/1967 Graubart .............................. 428/694
3,740,266 6/1973 Akachi et al. ..................... 252/62.54
3,840,400 10/1974 Yamada et al. .................. 252/62.54
4,115,290 9/1978 Kubota et al. .................... 252/62.54
4,323,628 4/1982 Okuyama et al. ................... 428/900

FOREIGN PATENT DOCUMENTS 54-97403 8/1979 Japan ................................. 428/900
54-29085 9/1979 Japan .

Primary Examiner—Stanley S. Silverman
Attorney, Agent, or Firm—Oblon, Fisher, Spivak, McClelland & Maier

[57] ABSTRACT

A magnetic recording tape or disc which has excellent physical characteristics of adhesive strength, a repeated running durability, and a gloss degree of the surface as well as excellent electromagnetic characteristics. A binder of a magnetic paint coating comprises 30 to 70 wt. % of an urethane resin, 10 to 50 wt. % of an epoxy resin and 10 to 50 wt. % of nitrocellulose, and if necessary a curing agent.

5 Claims, 1 Drawing Figure

MAGNETIC RECORDING MEDIUM

BACKGROUND OF THE INVENTION

1. Field of the Invention

The present invention relates to a magnetic recording medium. More particularly, it relates to a magnetic recording medium which has an electromagnetic transfer characteristic and satisfactory physical characteristics such as a repeated running durability and an adhesive strength and also has a surface smoothness.

2. Description of the Prior Art:

It has been mainly used as a magnetic recording medium a product prepared by coating a magnetic paint comprising a magnetic powder and a resin binder, on a substrate such as film made of polyacetate, polyvinyl chloride or polyester. Various binders have been proposed as the binders used in the magnetic paint. However, a magnetic recording medium having both of satisfactory electromagnetic transfer characteristics and satisfactory physical characteristics of the repeated running durability and the adhesive strength, has not been found.

The combination of the two components of said magnetic powder and a binder such as urethane resins, vinyl acetate resins, nitrocellulose resins and epoxy resins has been mainly used. It has been, however, difficult to satisfy both characteristics by said combination of said two components.

The inventors have studied various characteristics of the resin binders which have been previously used and have found that both characteristics can be achieved by combining three components of the urethane resin, the epoxy resin and the nitrocellulose at specific ratios. The present invention has been attained by said finding.

SUMMARY OF THE INVENTION

It is an object of the present invention to provide a magnetic recording medium which has both characteristics of the satisfactory electromagnetic transfer characteristic and the satisfactory physical characteristics of the repeated running durability and the adhesive strength as important characteristics indispensable for the magnetic recording medium.

It is another object of the present invention to provide a magnetic recording medium having the surface smoothness as well as the satisfactory electromagnetic transfer characteristic and the satisfactory physical characteristics.

The foregoing and other objects of the present invention have been attained by providing a magnetic recording medium prepared by coating a magnetic paint on a substrate wherein a binder used in the magnetic paint comprises 30 to 70 wt. % of an urethane resin, 10 to 50 wt. % of an epoxy resin and 10 to 50 wt. % of nitrocellulose.

BRIEF DESCRIPTION OF THE DRAWING

The FIGURE is a triangular coordinate of three components used as a resin binder in the present invention.

DETAILED DESCRIPTION OF THE PREFERRED EMBODIMENTS

Figure 1:
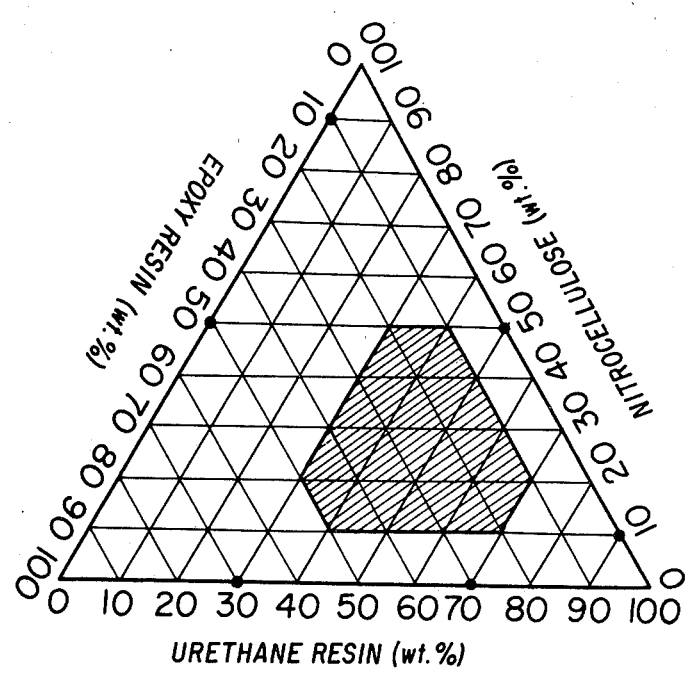

In accordance with the present invention, both of the electromagnetic transfer characteristic and the physical characteristics of the repeated running durability (durability in repeated runnings) and the adhesive strength which are indispensable for the magnetic recording medium have been satisfactorily achieved and the surface smoothness which contradicts to said characteristics is not deteriorated so that a magnetic recording medium having satisfactory total characteristics can be obtained.

As described above, in the present invention, the binder of the magnetic paint comprises three components of an urethane resin, an epoxy resin and a nitrocellulose.

The urethane resins are reaction products obtained by reacting a diisocyanate with a compound having hydroxyl group e.g. a glycol. It is preferable to use the urethane resin having terminal hydroxyl groups.

The urethane resins are described in Encyclopedia of Polymer Science and Technology. The typical urethane resins include toluenediisocyanate type urethanes (TDI); (Nippolan 3002, 3022, 5033, 5034 and 5037 (Nippon Polyurethane K.K.)); diphenylmethanediisocyanate type urethanes (MDI); (Estene 5703 and 5715 (Goodrich Co., Ltd.) and (Nippolan 2301, 2302, 2304 and 2320); and hexamethylenediisocyanate type urethanes (HDI); (Nippolan 5032).

The epoxy resins are condensed products obtained by condensing an epoxy compound with a compound having a reactive hydrogen atom, and are characterized by being thermosetting and by their content of epoxide groups. The epoxy resins are described in Encyclopedia of Polymer Science and Technology. The typical epoxy resins include bisphenol type epoxy resins (methylepichlorohydrin+bisphenol A): liquid type: (Epicoat 801, 807, 808 (Shell Chem. Co., Ltd.)); solid type: (Epicoat 1001, 1002, 1003, 1004, 1007 and 1009 (Shell)); ether ester type epoxy resins: (methyl epichlorohydrin+bisphenol A+dicarboxylic acid): (Epicoat OL-53-B40); ester type epoxy resins (methyl epichlorohydrin+-polycarboxylic acid); (Epicoat 190 (Shell)); novolack type epoxy resins (methyl epichlorohydrin+novolack); (Epicoat 152 and 154 (Shell)); and non-flamable type epoxy resin (methyl epichlorohydrin+brominated bisphenol A); (Epicoat 1045 (Shell)).

The nitrocelluloses are cellulose nitrate and the usages of the nitrocellulose are depending upon a degree of nitration. The nitrocelluloses are described in Encyclopedia of Polymer Science and Technology. The typical commercially available nitrocellulose include RS-20 (Daicel Co. Ltd.) and H-1/2 (Asahi Kasei K.K.).

In the present invention, the three components are combined at specific ratios which are defined in the triangular coordinate of the three components as the hatched region in the FIGURE.

That is, the binder comprises 30 to 70 wt.% of the urethane resin 10 to 50 wt. % of the epoxy resin and 10 to 50 wt. % of the nitrocellulose.

If a content of at least one of the components is out of said range, one or more important characteristic for the magnetic recording medium is inferior to cause a trouble from the viewpoint of the total characteristics. For example, when a content of the urethane resin is less than 30 wt. %, the adhesive strength is inferior whereas when it is higher than 70 wt. %, the adhesive strength is enough high, but the repeated running durability is inferior, whereby creak sound is caused or an adhesion on a head is caused.

When a content of the epoxy resin is less than 10 wt. %, the surface characteristic is inferior to cause the inferior electromagnetic characteristic whereas when it is more than 50 wt. %, a difference of coefficients of contraction between the substrate and the coated membrane is caused and the magnetic recording medium is curled or curved.

When a content of the nitrocellulose is less than 10 wt. %, the adhesive strength and the electromagnetic transfer characteristic are high enough but the repeated running durability is inferior, whereas when it is more than 50 wt.%, the adhesive strength is inferior and the repeated running durability at high temperature is remarkably low. The preparation of the magnetic recording medium, the content and kind of the magnetic powder and the other conditions are well known in this field and accordingly, they are not repeated in this specification.

In accordance with the present invention, the three components are combined at the specific ratios to prepare the magnetic paint having excellent characteristics as the binder and the binder is coated on the substrate to prepare the magnetic recording medium having desired characteristics. Thus, the magnetic recording medium such as the magnetic recording tape having excellent total characteristics including both of the electromagnetic transfer characteristic and the other physical characteristics can be obtained.

The present invention will be further illustrated by certain examples and references which are provided for purposes of illustration only and are not intended to be limiting the present invention.

EXAMPLE 1

| | |
|---|---|
| $\gamma$-$Fe_2O_3$ (cobalt doped) | 400 wt. parts |
| Dispersing agent | 6 wt. parts |
| Urethane resin | 60 wt. parts |
| (Nippolan 5033 manufactured by Nippon Polyurethane) | |
| Epoxy resin | 25 wt. parts |
| (Epicoat 1009 manufactured by Shell Chem. Co. Ltd.) | |
| Nitrocellulose | 15 wt. parts |
| (H½ manufactured by Asahi Kasei K.K.) | |
| Lubricant | 5 wt. parts |
| Methyl ethyl ketone | 500 wt. parts |
| Methyl isobutyl ketone | 200 wt. parts |
| Cyclohexanone | 200 wt. parts |

The components were charged in a ball mill and mixed to disperse them completely and then, 15 wt. parts of a curing agent of polyisocyanate (Dismodule L manufactured by Bayer A.G.) was admixed uniformly to prepare a coating dispersion. The coating dispersion was coated in a thickness of 6μ on a polyester film having a thickness of 12μ. The surface of the dried coated film was treated by a super calender as a surface processing and the binder was cured at 60° C. for 48 hours. The product was cut into magnetic tapes having a width of 3.81 mm.

The adhesive strength, the repeated running durability (durability in repeated runnings), the electromagnetic transfer characteristic and the surface smoothness (gloss degree) of the resultant audio magnetic recording tape were measured. The results are shown in Table 1 (Sample I).

Various magnetic recording tapes were prepared except varying the ratios of the three resin components as the binder and the same characteristics of these tapes were measured. The results are shown in Table 1 (Samples A to H).

In Table 1, the adhesive strength means the peeling strength between the magnetic coated membrane and the base film in the direction of 180 degree and is shown by the unit of gram per ⅛ inch.

The electromagnetic transfer characteristic and the gloss degree (measured by a glossmeter "GH-5" manufactured by Murakami Shikisai K.K.) are shown by relative values as those of Sample I being 0 dB.

TABLE 1

| Sample | A | B | C | D | E | F | G | H | I |
|---|---|---|---|---|---|---|---|---|---|
| Binder | | | | | | | | | |
| Urethane resin | 10 | 60 | 40 | 50 | 65 | 35 | 70 | 40 | 60 |
| Epoxy resin | 20 | 10 | 40 | 45 | 35 | 65 | — | — | 25 |
| Nitrocellulose | 70 | 30 | 20 | 5 | — | — | 30 | 60 | 15 |
| Characteristics | | | | | | | | | |
| Adhesive strength (g) | 2 | 23 | 20 | 30 | 200 more | 33 | 24 | 5 | 28 |
| Repeatability (time) | 430 | 960 | 1080 | 180 | 75 | 830 | 280 | 570 | 320 |
| Electromagnetic transfer characteristic 333 Hz (dB) | +1.3 | +0.8 | +0.6 | −0.7 | −2.1 | −1.0 | +0.5 | +1.1 | 0.0 |
| Gloss degree (dB) | +4.3 | +0.5 | +0.3 | −0.3 | −1.8 | −2.9 | +1.0 | +3.6 | 0.0 |

As it is found in Table 1, all of the adhesive strength, the repeated running durability, the electromagnetic transfer characteristic and the gloss degree of Samples B, C and I in the range of the present invention are excellent and the samples are the magnetic recording tapes having excellent total characteristics.

On the other hand, Samples A, D, E, F, G and H which are out of the range of the present invention have certain excellent characteristics but have certain inferior characteristics which cause a trouble as the total characteristics in a practical use.

A content of the curing agent is preferably in a range of 8 to 20 wt. parts based on 100 wt. parts of the binder. When it is less than 8 wt. parts, the crosslinking effect is not satisfactory whereas when it is more than 20 wt. parts, the adhesive strength between the coated membrane and the base film is inferior.

As described above, the magnetic recording medium of the present invention has excellent total characteristics of the adhesive strength, the repeated running durability, the electromagnetic characteristic and the gloss degree of the surface which are superior to those of the conventional ones.

We claim:

1. In a magnetic recording medium comprising a substrate and a magnetic paint coating which comprises a binder and a magnetic powder, the improvement characterized in that the binder in the magnetic paint comprises 30 to 70 wt.% of a urethane resin, 10 to 50 wt. % of a thermosetting epoxy resin characterized by its content of epoxide groups, and 10 to 50 wt.% of a nitrocellulose.

2. A magnetic recording medium according to claim 1 which is a magnetic recording tape.

3. A magnetic recording medium according to claim 1 which is a magnetic recording disc.

4. A magnetic recording medium according to claim 1 wherein a curing agent is incorporated at a ratio of 8 to 20 wt. parts based on 100 wt. parts of the binder.

5. A magnetic recording medium according to claim 4 wherein the curing agent is a polyisocyanate.

* * * * *